(12) United States Patent
Sha et al.

(10) Patent No.: US 11,948,052 B2
(45) Date of Patent: Apr. 2, 2024

(54) METHOD, ELECTRONIC DEVICE, AND COMPUTER PROGRAM PRODUCT FOR MONITORING FIELD DEVICE

(71) Applicant: EMC IP Holding Company LLC, Hopkinton, MA (US)

(72) Inventors: Danqing Sha, Shanghai (CN); Pedro Fernandez Orellana, Shanghai (CN); Zhen Jia, Shanghai (CN); Xuwei Tang, Nanjing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 921 days.

(21) Appl. No.: 16/934,646

(22) Filed: Jul. 21, 2020

(65) Prior Publication Data
US 2021/0406764 A1 Dec. 30, 2021

(30) Foreign Application Priority Data
Jun. 30, 2020 (CN) .......................... 202010618669.2

(51) Int. Cl.
*G06N 20/00* (2019.01)
*G06Q 10/06* (2023.01)
(Continued)

(52) U.S. Cl.
CPC ......... *G06N 20/00* (2019.01); *G06Q 10/0631* (2013.01); *G05B 2219/39449* (2013.01)

(58) Field of Classification Search
CPC .... G06N 20/00; G06N 21/20; G06Q 10/0631; G05B 2219/39449; G05B 2219/32014; G05B 19/0428; G01C 21/20; G01D 21/02
(Continued)

(56) References Cited

U.S. PATENT DOCUMENTS

| 5,956,665 A | 9/1999 | Martinez et al. |
| 6,384,842 B1 | 5/2002 | DeKoning et al. |

(Continued)

FOREIGN PATENT DOCUMENTS

| CN | 106595565 A | 4/2017 |
| CN | 107729065 A | 2/2018 |

(Continued)

OTHER PUBLICATIONS

Intel, "Monitoring Media Wearout Levels of Intel Solid-State Drives," Technology Brief, 2011, 2 pages.

(Continued)

*Primary Examiner* — Michael J Brown
(74) *Attorney, Agent, or Firm* — Ryan, Mason & Lewis, LLP (57) ABSTRACT

The present disclosure relates to a method, an electronic device, and a computer program product for monitoring a field device. For example, a method for monitoring a field device is provided. The method may include receiving facility information data associated with locations of a group of field devices and a sensing data set acquired by a sensing apparatus arranged near the group of field devices. The method may further include determining, according to a determination that sensing data associated with at least one field device in the group of field devices in the sensing data set is abnormal, a target location of the at least one field device based on the facility information data. In addition, the method may further include generating navigation information from a source location where a user is located to the target location.

20 Claims, 6 Drawing Sheets

(51) Int. Cl.
*G06Q 10/0631* (2023.01)
*G01D 21/02* (2006.01)
*G05B 19/04* (2006.01)

(58) Field of Classification Search
USPC .......................................................... 700/31
See application file for complete search history.

(56) References Cited

U.S. PATENT DOCUMENTS

| | | | |
|---|---|---|---|
| 7,322,010 B1 | 1/2008 | Mikula | |
| 7,369,061 B1 | 5/2008 | Sellers | |
| 7,447,807 B1 | 11/2008 | Merry et al. | |
| 8,836,580 B2 | 9/2014 | Mendelson | |
| 8,930,134 B2 | 1/2015 | Gu et al. | |
| 9,958,277 B1 | 5/2018 | Espy et al. | |
| 9,959,190 B2 | 5/2018 | Klein et al. | |
| 10,096,003 B2* | 10/2018 | Vahid | G06Q 10/20 |
| 10,288,432 B1* | 5/2019 | Sokolov | G01C 21/206 |
| 10,409,523 B1 | 9/2019 | Kim et al. | |
| 10,410,424 B1 | 9/2019 | Khokhar et al. | |
| 2005/0090911 A1 | 4/2005 | Ingargiola et al. | |
| 2006/0053447 A1 | 3/2006 | Krzyzanowski et al. | |
| 2006/0095662 A1 | 5/2006 | Arnott | |
| 2006/0247849 A1 | 11/2006 | Mohsini et al. | |
| 2007/0069923 A1 | 3/2007 | Mendelson | |
| 2007/0294032 A1 | 12/2007 | Zumsteg et al. | |
| 2008/0040522 A1 | 2/2008 | Matthews | |
| 2009/0003353 A1 | 1/2009 | Ding et al. | |
| 2009/0249213 A1 | 10/2009 | Murase et al. | |
| 2010/0070169 A1 | 3/2010 | Paulin et al. | |
| 2010/0094536 A1 | 4/2010 | Lee et al. | |
| 2010/0191908 A1 | 7/2010 | Yamakawa | |
| 2010/0317420 A1 | 12/2010 | Hoffberg | |
| 2011/0115816 A1 | 5/2011 | Brackney | |
| 2011/0222548 A1 | 9/2011 | Conway | |
| 2011/0310120 A1 | 12/2011 | Narayanan | |
| 2012/0090004 A1 | 4/2012 | Jeong | |
| 2012/0239319 A1 | 9/2012 | Singh | |
| 2012/0311260 A1 | 12/2012 | Yamagiwa et al. | |
| 2013/0031202 A1 | 1/2013 | Mick et al. | |
| 2013/0114100 A1 | 5/2013 | Torii et al. | |
| 2014/0025414 A1 | 1/2014 | Worden et al. | |
| 2014/0114560 A1 | 4/2014 | Jensen et al. | |
| 2014/0173474 A1 | 6/2014 | Klemenz et al. | |
| 2014/0180572 A1 | 6/2014 | Acker, Jr. et al. | |
| 2014/0195454 A1 | 7/2014 | Richie et al. | |
| 2014/0304342 A1 | 10/2014 | Shekhar | |
| 2015/0051994 A1 | 2/2015 | Ward et al. | |
| 2015/0126129 A1 | 5/2015 | Rangappagowda et al. | |
| 2015/0133152 A1 | 5/2015 | Edge et al. | |
| 2015/0277931 A1 | 10/2015 | Staude et al. | |
| 2016/0029158 A1 | 1/2016 | Hansen | |
| 2016/0086141 A1 | 3/2016 | Jayanthi et al. | |
| 2016/0127871 A1 | 5/2016 | Smith et al. | |
| 2016/0196584 A1 | 7/2016 | Franklin et al. | |
| 2017/0012996 A1 | 1/2017 | Hu et al. | |
| 2017/0017617 A1 | 1/2017 | Sato et al. | |
| 2017/0228161 A1 | 8/2017 | Nangoh | |
| 2017/0285943 A1 | 10/2017 | Dalmatov | |
| 2017/0285972 A1 | 10/2017 | Dalmatov | |
| 2017/0288945 A1 | 10/2017 | Chandangoudar | |
| 2018/0018822 A1 | 1/2018 | Zagrebin et al. | |
| 2018/0035606 A1 | 2/2018 | Burdoucci | |
| 2018/0158209 A1 | 6/2018 | Fine et al. | |
| 2018/0239991 A1 | 8/2018 | Weller et al. | |
| 2019/0347746 A1 | 11/2019 | Duncan et al. | |

FOREIGN PATENT DOCUMENTS

| | | |
|---|---|---|
| CN | 107783463 A | 3/2018 |
| CN | 108648266 A | 10/2018 |
| CN | 109870987 A | 6/2019 |
| DE | 202017007194 U1 | 1/2020 |
| EP | 3467597 A1 | 4/2019 |

OTHER PUBLICATIONS

Y. Park et al., "Self-Controllable Secure Location Sharing for Trajectory-Based Message Delivery on Cloud-Assisted VANETs," Sensors (Basel), Jul. 1, 2018, 23 pages.
Nintendo, "Pokemon GO," https://www.pokemon.com/US/pokemon-video-games/pokemon-go/, 2019, 12 pages.
E. Kim, "DeepBLE—Localized Navigation Using Low Energy Bluetooth," University of Pennsylvania School of Engineering and Applied Science, 2013-2014, 7 pages.
U.S. Appl. No. 16/261,941 filed in the name of Brian C. Mullins et al. on Jan. 30, 2019, and entitled "Location Assurance Using Location Indicators Modified by Shared Secrets."
U.S. Appl. No. 16/882,870 filed in the name of Zhen Jia et al. on May 26, 2020, and entitled "Method, Device, and Computer Program Product for Managing Application Environment."
Chinese Office Action in China Application 202010618669.2, dated Nov. 9, 2023, 5 pages.
Chinese Search Report in China Application 202010618669.2, dated Nov. 3, 2023, 3 pages.

* cited by examiner

METHOD, ELECTRONIC DEVICE, AND COMPUTER PROGRAM PRODUCT FOR MONITORING FIELD DEVICE

RELATED APPLICATION(S)

The present application claims priority to Chinese Patent Application No. 202010618669.2, filed Jun. 30, 2020, and entitled "Method, Electronic Device, and Computer Program Product for Monitoring Field Device," which is incorporated by reference herein in its entirety.

FIELD

Embodiments of the present disclosure generally relate to the field of computer networks, and in particular, to a method, an electronic device, and a computer program product for monitoring a field device.

BACKGROUND

Many IT infrastructures (such as data centers) are characterized by very large amounts of hardware. In an IT infrastructure, it is very time-consuming to inspect or find a problematic hardware device, especially for maintenance personnel who are not familiar with specific locations of various hardware devices. In addition, the maintenance personnel also need to perform daily routine inspections, which require manual inspections of hardware devices on each rack twice a day. For example, LED indicators on hardware devices have different colors, indicating different states of the hardware devices. The maintenance personnel must inspect the hardware devices one by one to determine whether there is a hardware device in an abnormal state. This is obviously time-consuming and laborious, and missing inspections may also exist. In addition, from the perspective of human health, being exposed to a large amount of electromagnetic radiation and a low-temperature environment in the IT infrastructure for a long time will adversely affect the health of the maintenance personnel. Therefore, an efficient device monitoring method is urgently needed.

SUMMARY

A method, an electronic device, and a computer program product for monitoring a field device are provided in the embodiments of the present disclosure.

In a first aspect of the present disclosure, a method for monitoring a field device is provided. The method may include receiving facility information data associated with locations of a group of field devices and a sensing data set acquired by a sensing apparatus arranged near the group of field devices. The method may further include determining, according to a determination that sensing data associated with at least one field device in the group of field devices in the sensing data set is abnormal, a target location of the at least one field device based on the facility information data. In addition, the method may further include generating navigation information from a source location where a user is located to the target location.

In a second aspect of the present disclosure, an electronic device is provided. The device includes: at least one processing unit; and at least one memory, the at least one memory being coupled to the at least one processing unit and storing instructions configured to be executed by the at least one processing unit, wherein when executed by the at least one processing unit, the instructions cause the device to perform actions including: receiving facility information data associated with locations of a group of field devices and a sensing data set acquired by a sensing apparatus arranged near the group of field devices; determining, according to a determination that sensing data associated with at least one field device in the group of field devices in the sensing data set is abnormal, a target location of the at least one field device based on the facility information data; and generating navigation information from a source location where a user is located to the target location.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method described according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

The same or corresponding reference numerals in the accompanying drawings represent the same or corresponding parts.

DETAILED DESCRIPTION

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, in a conventional maintenance process of an IT infrastructure that includes a large number of hardware devices such as servers, maintenance personnel usually conduct a "carpet" inspection on each hardware device regularly. Specifically, the maintenance personnel will check states of a meter and an LED indicator of each hardware device one by one in the inspection process to determine whether the IT infrastructure is operating normally. In addition, the maintenance personnel must pay attention to temperature information of an environment where the IT infrastructure is located for a long time. It should be understood that such inspection is time-consuming and missing inspections may also occur. In addition, once an abnormal situation occurs in the IT infrastructure, even if a hardware device that may be faulty can be preliminarily determined based on experience, the maintenance personnel cannot find the problem of the faulty device from a large number of hardware devices. Therefore, how to reasonably use the existing system architecture, to efficiently and comprehensively implement and grasp state information of various hardware devices in the IT infrastructure, and to quickly locate a faulty device when an abnormality occurs, is currently an urgent problem to be solved.

In order to solve the above problems and improve the user experience, example embodiments of the present disclosure propose a monitoring system using a building information model (BIM) and an augmented reality (AR) technology, which enables state data of various hardware devices in a monitored IT infrastructure to be intuitively presented to users (such as maintenance personnel or remote technical support personnel). The monitoring system can monitor each hardware device and a portion thereof in the IT infrastructure in real time, so that the users do not need to spend a lot of time and energy to conduct manual inspections. In addition, when a certain hardware device is abnormal, the monitoring system can determine a location of the hardware device, and assist a user to find the hardware device by, for example, navigation. Therefore, the time spent on system maintenance is shortened, a lot of manpower and material resources are saved, and the user experience is improved ultimately.

Figure 1:
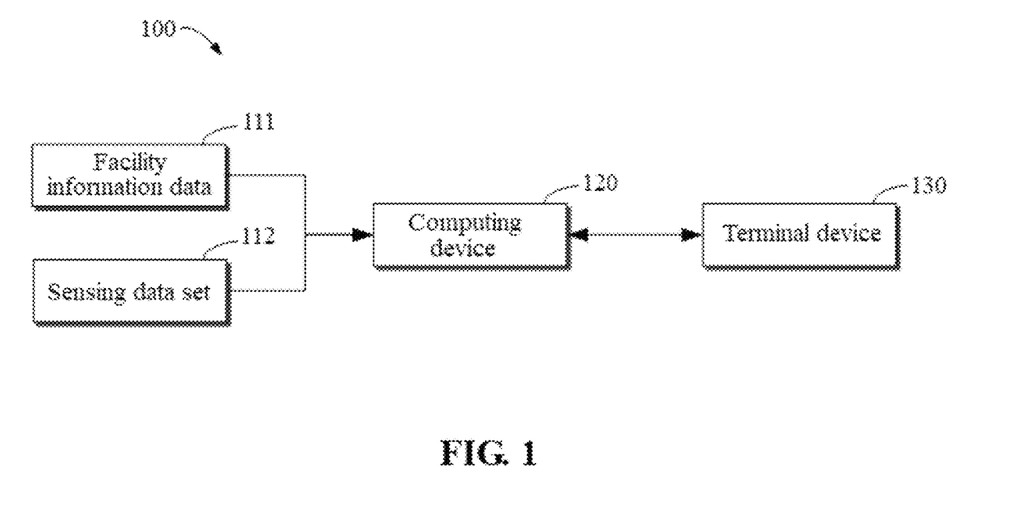
FIG. 1 is a schematic diagram of an example environment in which an embodiment of the present disclosure can be implemented.

FIG. 1 is a schematic diagram of example environment 100 in which an embodiment of the present disclosure can be implemented. In example environment 100, facility information data 111 associated with a location of a monitored field device and sensing data set 112 acquired by a sensing apparatus arranged near the monitored field device are input to computing device 120. Computing device 120 may perform data fusion on facility information data 111 and sensing data set 112 to display an image based on the augmented reality (AR) technology to a user through terminal device 130. Here, the "facility" refers to a detailed architectural layout of a building, such as a planar structure of the building, an arrangement of electrical appliances therein, and the like. The "facility information data" refers to detailed location information of all facilities in the building, which can be in the form of a two-dimensional or three-dimensional map. The above examples are only intended to describe the present disclosure, not to specifically limit the present disclosure.

As shown in FIG. 1, for example, a user may wear terminal device 130 such as AR glasses to immersively view a virtual image about a field device generated by computing device 120, as well as state information and location information of the field device. It should be understood that computing device 120 may be located locally, remotely, or in a cloud. For example, computing device 120 may be a remote computing device. For another example, a portion of computing device 120 may be a remote computing device for performing data fusion, and another portion of computing device 120 may be a cloud computing device for executing a more complicated machine learning algorithm. In some embodiments, computing device 120 may include, but is not limited to, personal computers, server computers, handheld or laptop devices, mobile devices (such as mobile phones, personal digital assistants (PDAs), and media players), multiprocessor systems, consumer electronics, small computers, mainframe computers, distributed computing environments including any of the above systems or devices, etc.

In the embodiment of FIG. 1, in addition to being implemented as the AR glasses, terminal device 130 may also be implemented as a working terminal with input and output functions and a communication connection function, such as a mobile phone and a tablet computer. After displaying a virtual scenario related to the monitored field device to the user, terminal device 130 can also receive instructions of the user, such as generating navigation information to a target location where the specific field device is located, and generating suggestion information for solving a problem of abnormality. Terminal device 130 will upload these instructions to computing device 120 and provide a result determined by computing device 120 to the user. In this way, the monitoring process of the field device no longer needs to take a long time, thereby saving a lot of time and system resources, and avoiding occurrence of missing inspection.

It should be understood that the environment shown in FIG. 1 is merely an example, and does not specifically limit the present disclosure. The number and structure of components and the arrangement of the environment in the embodiment shown in FIG. 1 are examples for description, and are not intended to limit the present disclosure in any way.

Figure 2:
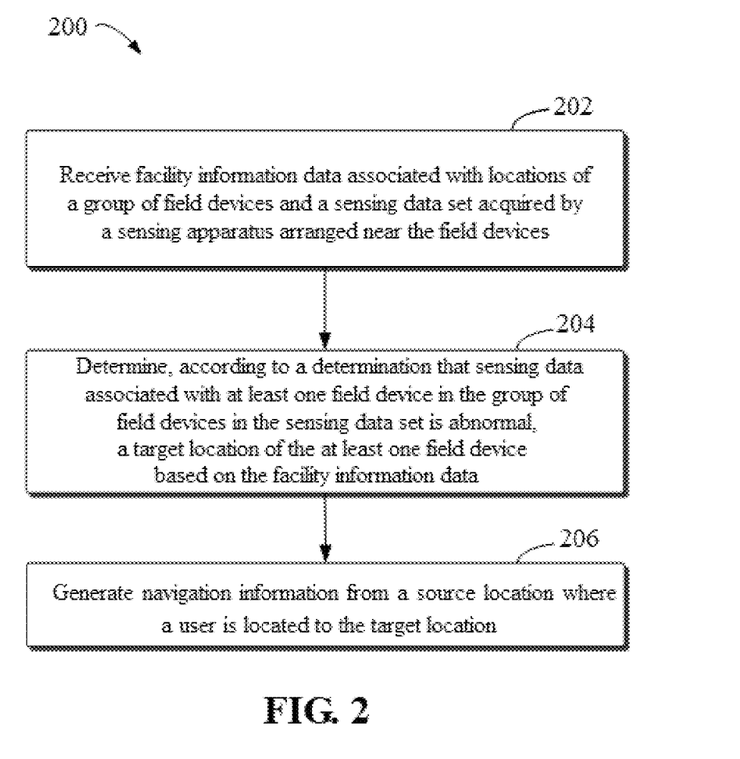
FIG. 2 is a flowchart of a process for monitoring a field device according to an embodiment of the present disclosure.

FIG. 2 is a flowchart of a process for monitoring a field device according to an embodiment of the present disclosure. In some embodiments, process 200 may be implemented by computing device 120 in FIG. 1. For example, process 200 may be implemented in example environment 100 shown in FIG. 1. Process 200 for monitoring a field device according to an embodiment of the present disclosure will now be described with reference to FIG. 2. For ease of understanding, specific situations mentioned in the following description are all examples and are not intended to limit the protection scope of the present disclosure.

In 202, computing device 120 may receive facility information data 111 associated with locations of a group of field devices and sensing data set 112 acquired by a sensing apparatus arranged near the group of field devices. For example, the field device may be a hardware device of an IT infrastructure (e.g., a data center), such as a rack, a cable connection, a storage device, and a server. In addition, for example, facility information data 111 may be three-dimensional data provided by a building information model (BIM). The BIM is an intelligent modeling method based on three-dimensional models, and can be used for planning, designing, constructing, and managing buildings and infrastructures within the buildings more effectively. The field devices of a monitored data center are usually arranged in a modern building, and therefore, location information of the field devices and an internal structure of the building where the field devices are located can be easily obtained through the BIM model.

In 204, computing device 120 may determine, when it is detected that sensing data associated with at least one field device in the group of field devices in sensing data set 112 is abnormal, a target location of the at least one field device based on facility information data 111.

For example, the abnormal sensing data in sensing data set 112 may be a hardware image of the at least one field device acquired by a field camera. For example, computing device 120 may recognize the hardware image to determine an abnormal display of meter data or LED indicators in the recognized hardware image, or computing device 120 may recognize open flames or smoke to determine that the field device is abnormal. Thereafter, computing device 120 can find a target location of the field device based on facility information data 111. Alternatively, computing device 120 may also provide alarm information to the user.

For another example, the abnormal sensing data in sensing data set 112 may also be environmental sensing data of the at least one field device acquired by a temperature sensor, a smoke sensor, or the like. For example, computing device 120 may compare the environmental sensing data of the at least one field device acquired by the temperature sensor, the smoke sensor, or the like with historical data (or threshold data) to determine that the field device is abnormal. Thereafter, computing device 120 can find the target location of the field device based on facility information data 111. Alternatively, computing device 120 may also provide alarm information to the user. In the above two manners, the field devices can be automatically monitored, so that safety problems of the field devices can be discovered more quickly and promptly.

In 206, computing device 120 may generate navigation information from a source location where the user is located to the target location. In some embodiments, computing device 120 may apply facility information data 111, the source location of the user, and the target location where the abnormal field device is located to a navigation model, for generating the navigation information. It should be understood that the navigation model may be a machine learning model or a deep learning model. For example, the navigation model may be obtained by training with a pre-annotated training data set. The training data set includes reference facility information data, a reference source location, and a reference target location as inputs to the navigation model, and reference navigation information as an output of the navigation model. If a large number of field devices are arranged in the building, the solution of the present disclosure will locate and navigate to the abnormal field device more quickly and maintain the abnormal field device timely.

Figure 3:
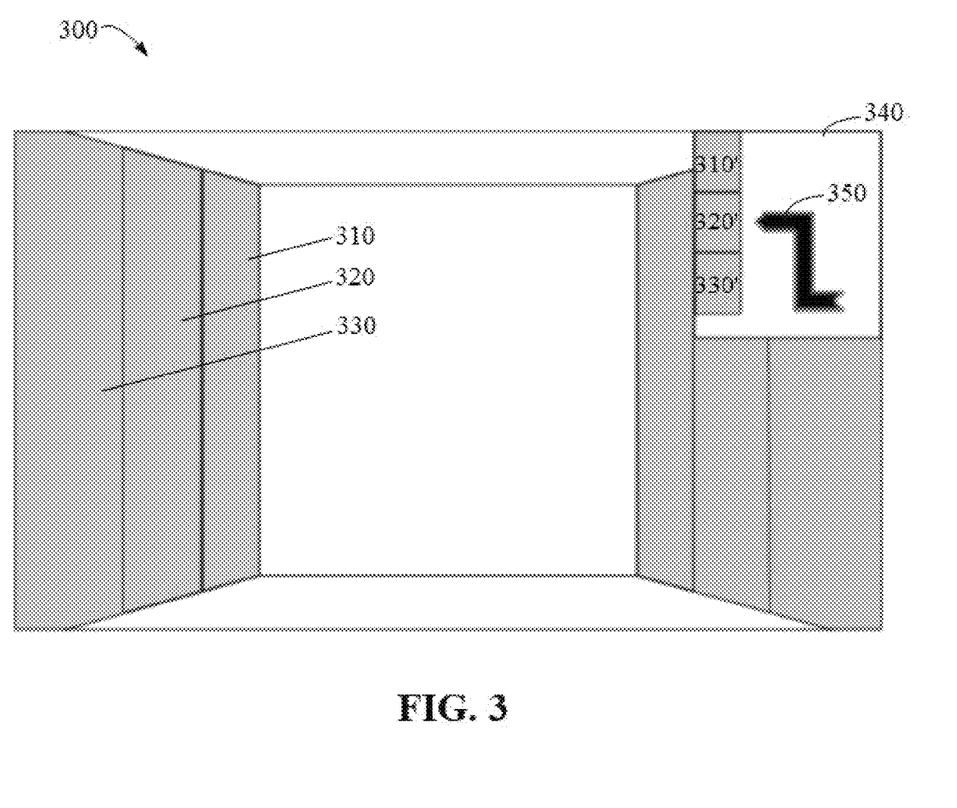
FIG. 3 is a schematic diagram of a user interface for monitoring a field device according to an embodiment of the present disclosure.

For example, computing device 120 may provide the user with an immersive display perspective based on the AR technology. FIG. 3 is a schematic diagram of user interface 300 for monitoring a field device according to an embodiment of the present disclosure. As shown in FIG. 3, user interface 300 in which the user can immersively view field devices may include first virtual field device 310, second virtual field device 320, third virtual field device 330, and the like, for indicating a plurality of field devices. It should be understood that user interface 300 is only a three-dimensional perspective for the user to view the field devices. When the user approaches one of first virtual field device 310, second virtual field device 320, and third virtual field device 330 through terminal device 130, user interface 300 will be changed accordingly.

At the same time, in some embodiments, user interface 300 may also include navigation information 340 based on a two-dimensional map. As shown in FIG. 3, navigation information 340 may further include first virtual field device two-dimensional representation 310', second virtual field device two-dimensional representation 320', and third virtual field device two-dimensional representation 330' associated with first virtual field device 310, second virtual field device 320, and third virtual field device 330, respectively. For example, when it is detected that a field device represented by second virtual field device 320 is abnormal, navigation path 350 to second virtual field device two-dimensional representation 320' associated with second virtual field device 320 will be displayed in navigation information 340. Navigation path 350 may be the most convenient path from a source location where terminal device 130 of the user is located to a target location where the abnormal field device is located.

In some embodiments, computing device 120 may perform data fusion on location information of a group of field devices and a sensing data set of the field devices to provide two-dimensional field information and navigation information to the user. Preferably, computing device 120 may also provide AR-based field information and navigation information to the user.

Figure 4:
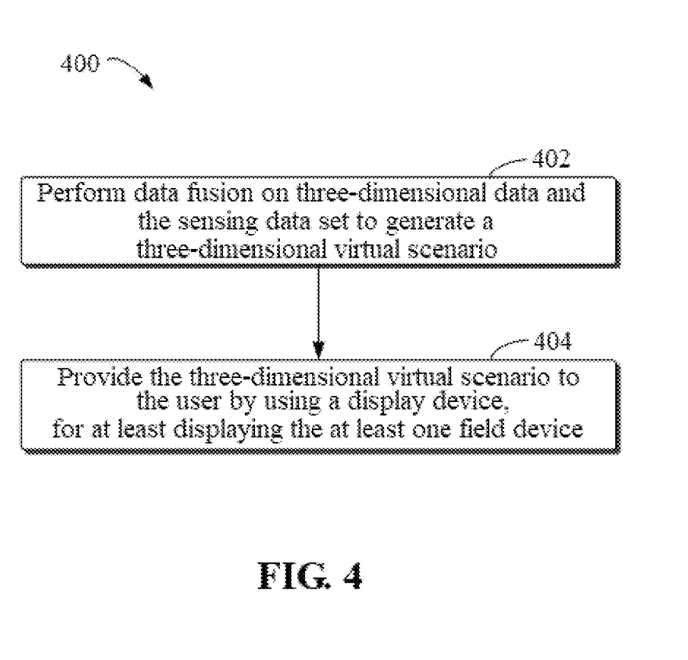
FIG. 4 is a flowchart of an example process for performing data fusion and display according to an embodiment of the present disclosure.

Specifically, FIG. 4 is a flowchart of example process 400 for performing data fusion and display according to an embodiment of the present disclosure. In some embodiments, process 400 may be implemented by computing device 120 in FIG. 1. For example, process 400 may be implemented in example environment 100 shown in FIG. 1. Example process 400 for performing data fusion and display according to an embodiment of the present disclosure will now be described with reference to FIG. 4. For ease of understanding, the specific situations mentioned in the following description are all examples and are not intended to limit the protection scope of the present disclosure.

In 402, computing device 120 may perform data fusion on three-dimensional data of a building information model as facility information data 111 and sensing data set 112 to generate a three-dimensional virtual scenario (e.g., user interface 300 shown in FIG. 3). Thereafter, in 404, computing device 120 may provide the three-dimensional virtual scenario to the user by using a display device, for at least displaying the at least one abnormal field device. For example, the display device includes AR glasses. In this way, a more user-friendly monitoring interface for field devices can be provided, thereby lowering the threshold for practitioners.

Figure 5:
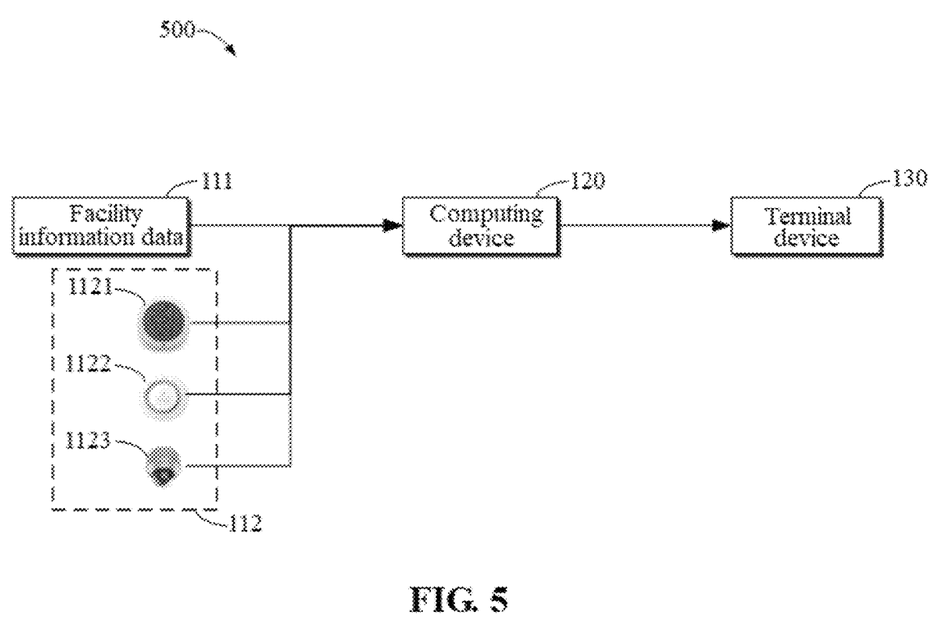
FIG. 5 is a schematic diagram of an example environment in which an embodiment of the present disclosure can be implemented.

FIG. 5 is a schematic diagram of example environment 500 in which an embodiment of the present disclosure can be implemented. Similar to FIG. 1, computing device 120 may receive, for example, BIM-based facility information data 111 and sensing data set 112 acquired by a sensing apparatus. Thereafter, computing device 120 may serve as a remote computing device to perform data fusion on facility information data 111 and sensing data set 112, and computing device 120 may serve as a cloud computing device to execute a more complicated machine learning algorithm to send, to terminal device 130, result information for displaying to the user.

A difference from FIG. 1 is that FIG. 5 shows in detail that the sensing apparatus for acquiring sensing data set 112 may include temperature sensor 1121. As shown in FIG. 5, temperature sensor 1121 may acquire temperature information of the field device as environmental sensing data. Moreover, the sensing apparatus may include smoke sensor 1122 configured to acquire smoke information of the field device as the environmental sensing data. In addition, the sensing apparatus may include camera 1123, which may acquire a hardware image of the field device, and recognize, through computing device 120, the hardware image as hardware data representing state information of the field device.

In some embodiments, for example, when the sensing data in sensing data set 112 is a hardware image of a field device, computing device 120 as a cloud computing device may determine, based on the hardware image, hardware data corresponding to an abnormal image portion. Thereafter, computing device 120 may apply the hardware data to an abnormality solving model arranged in computing device 120, thereby generating suggestion information for solving the abnormality. It should be understood that the suggestion information may be modular buttons selected level by level by the user. By using modular buttons to operate in an AR-based virtual environment or a BIM model displayed on a screen, the problem of abnormality can be more easily solved without typing instructions, thereby lowering the knowledge threshold for maintenance personnel. It should also be understood that the above abnormality solving model is obtained by training with reference hardware data as an input and reference suggestion information as an output, which will not be described in detail herein.

In some other embodiments, for example, when the sensing data in sensing data set 112 includes the environmental sensing data of the field device, computing device 120 as a cloud computing device may generate alarm information when determining that the environmental sensing data is abnormal.

Through the above embodiments, the time and human costs required for monitoring field devices can be significantly reduced. In addition, the embodiments of the present disclosure can also support immersive display based on the BIM model and the AR technology, and provide state information of various field devices displayed on the user interface, thereby providing a more user-friendly function of monitoring the field devices. In addition, the embodiments of the present disclosure may enable technical support personnel located remotely and maintenance personnel located on site to collaborate for achieving system maintenance and solving abnormalities. Moreover, the technical solution of the present disclosure can also significantly shorten the time that the user is exposed to an on-site environment, thereby being of benefit to the physical health of the user.

Figure 6:
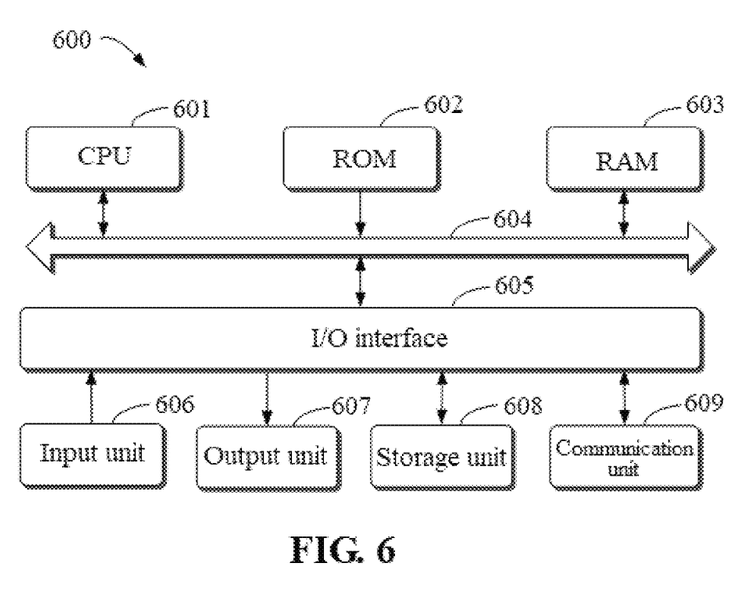
FIG. 6 is a schematic block diagram of an example device that can be used to implement an embodiment of content of the present disclosure.

FIG. 6 is a schematic block diagram of example device 600 that can be used to implement an embodiment of content of the present disclosure. As shown in the figure, device 600 includes central processing unit (CPU) 601 that can perform various appropriate actions and processing according to computer program instructions stored in read-only memory (ROM) 602 or computer program instructions loaded from storage unit 608 into random access memory (RAM) 603. In RAM 603, various programs and data required for the operation of device 600 can also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

Various processes and processing described above, for example, processes 200 and/or 400, can be performed by CPU 601. For example, in some embodiments, processes 200 and/or 400 may be implemented as a computer software program that is tangibly included in a machine-readable medium, for example, storage unit 608. In some embodiments, part or all of the computer program may be loaded and/or installed onto device 600 via ROM 602 and/or communication unit 609. When the computer program is loaded into RAM 603 and executed by CPU 601, one or more actions of processes 200 and/or 400 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device such as a punch card or a protruding structure in a groove with instructions stored thereon, and any suitable combination of the foregoing. The computer-readable storage medium used here is not construed as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described herein with reference to flowcharts and/or block diagrams of the method, the apparatus (the system), and the computer program product according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms used herein is intended to best explain the principles and practical applications of the embodiments or the technological improvements to technologies on the market, and to otherwise enable persons of ordinary skill in the art to understand the embodiments disclosed herein.

What is claimed is:

1. A method for monitoring a field device, comprising:
receiving facility information data associated with locations of a group of field devices and a sensing data set acquired by a sensing apparatus arranged near the group of field devices;
determining, according to a determination that sensing data associated with at least one field device in the group of field devices in the sensing data set is abnormal, a target location of the at least one field device based on the facility information data; and
generating navigation information from a source location where a user is located to the target location;
wherein the sensing data comprises a hardware image of the at least one field device, and the method further comprises:
determining, based on the hardware image, hardware data corresponding to an abnormal image portion; and
applying the hardware data to an abnormality solving model to generate suggestion information for solving the abnormality.

2. The method of claim 1, wherein
the abnormality solving model is obtained by training with reference hardware data as an input and reference suggestion information as an output.

3. The method of claim 1, wherein the sensing data comprises environmental sensing data of the at least one field device, and the method further comprises:
generating alarm information according to a determination that the environmental sensing data is abnormal.

4. The method of claim 1, wherein generating the navigation information comprises:
applying the facility information data, the source location, and the target location to a navigation model to generate the navigation information, the navigation model being obtained by training with reference facility information data, a reference source location, and a reference target location as inputs and reference navigation information as an output.

5. The method of claim 1, wherein the sensing apparatus comprises at least one of the following:
a temperature sensor configured to acquire temperature information of the at least one field device as environmental sensing data of the at least one field device;
a smoke sensor configured to acquire smoke information of the at least one field device as the environmental sensing data; and
a camera configured to acquire a hardware image of the at least one field device.

6. A method for monitoring a field device, comprising:
receiving facility information data associated with locations of a group of field devices and a sensing data set acquired by a sensing apparatus arranged near the group of field devices; and
determining, according to a determination that sensing data associated with at least one field device in the group of field devices in the sensing data set is abnormal, a target location of the at least one field device based on the facility information data;
wherein the facility information data comprises three-dimensional data of a building information model, and the method further comprises:
performing data fusion on the three-dimensional data and the sensing data set to generate a three-dimensional virtual scenario; and
providing the three-dimensional virtual scenario to a user by using a display device, for at least displaying the at least one field device.

7. The method of claim 6, wherein the display device comprises augmented reality glasses.

8. An electronic device, comprising:
at least one processing unit; and
at least one memory, the at least one memory being coupled to the at least one processing unit and storing instructions configured to be executed by the at least one processing unit, wherein when executed by the at least one processing unit, the instructions cause the electronic device to perform actions comprising:
receiving facility information data associated with locations of a group of field devices and a sensing data set acquired by a sensing apparatus arranged near the group of field devices;
determining, according to a determination that sensing data associated with at least one field device in the group of field devices in the sensing data set is abnormal, a target location of the at least one field device based on the facility information data; and
generating navigation information from a source location where a user is located to the target location;
wherein the sensing data comprises a hardware image of the at least one field device, and the actions further comprise:
determining, based on the hardware image, hardware data corresponding to an abnormal image portion; and
applying the hardware data to an abnormality solving model to generate suggestion information for solving the abnormality.

9. The electronic device of claim 8, wherein
the abnormality solving model is obtained by training with reference hardware data as an input and reference suggestion information as an output.

10. The electronic device of claim 8, wherein the sensing data comprises environmental sensing data of the at least one field device, and the actions further comprise:
generating alarm information according to a determination that the environmental sensing data is abnormal.

11. The electronic device of claim 8, wherein generating the navigation information comprises:
applying the facility information data, the source location, and the target location to a navigation model to generate the navigation information, the navigation model being obtained by training with reference facility information data, a reference source location, and a reference target location as inputs and reference navigation information as an output.

12. The electronic device of claim 8, wherein the sensing apparatus comprises at least one of the following:
a temperature sensor configured to acquire temperature information of the at least one field device as environmental sensing data of the at least one field device;
a smoke sensor configured to acquire smoke information of the at least one field device as the environmental sensing data; and
a camera configured to acquire a hardware image of the at least one field device.

13. An electronic device, comprising:
at least one processing unit; and
at least one memory, the at least one memory being coupled to the at least one processing unit and storing instructions configured to be executed by the at least one processing unit, wherein when executed by the at least one processing unit, the instructions cause the electronic device to perform actions comprising:
receiving facility information data associated with locations of a group of field devices and a sensing data set acquired by a sensing apparatus arranged near the group of field devices; and
determining, according to a determination that sensing data associated with at least one field device in the group of field devices in the sensing data set is abnormal, a target location of the at least one field device based on the facility information data;
wherein the facility information data comprises three-dimensional data of a building information model, and the actions further comprise:
performing data fusion on the three-dimensional data and the sensing data set to generate a three-dimensional virtual scenario; and
providing the three-dimensional virtual scenario to a user by using a display device, for at least displaying the at least one field device.

14. The electronic device of claim 13, wherein the display device comprises augmented reality glasses.

15. A computer program product being tangibly stored in a non-transitory computer storage medium and comprising machine-executable instructions, wherein when executed by a device, the machine-executable instructions cause the device to perform a method for monitoring a field device, the method comprising:
receiving facility information data associated with locations of a group of field devices and a sensing data set acquired by a sensing apparatus arranged near the group of field devices;
determining, according to a determination that sensing data associated with at least one field device in the group of field devices in the sensing data set is abnormal, a target location of the at least one field device based on the facility information data; and generating navigation information from a source location where a user is located to the target location;

wherein the sensing data comprises a hardware image of the at least one field device, and the method further comprises:

determining, based on the hardware image, hardware data corresponding to an abnormal image portion; and applying the hardware data to an abnormality solving model to generate suggestion information for solving the abnormality.

16. The computer program product of claim 15, wherein the abnormality solving model is obtained by training with reference hardware data as an input and reference suggestion information as an output.

17. The computer program product of claim 15, wherein the sensing data comprises environmental sensing data of the at least one field device, and the method further comprises:

generating alarm information according to a determination that the environmental sensing data is abnormal.

18. The computer program product of claim 15, wherein the facility information data comprises three-dimensional data of a building information model, and the method further comprises:

performing data fusion on the three-dimensional data and the sensing data set to generate a three-dimensional virtual scenario; and providing the three-dimensional virtual scenario to the user by using a display device, for at least displaying the at least one field device.

19. The computer program product of claim 18, wherein the display device comprises augmented reality glasses.

20. The computer program product of claim 15, wherein generating the navigation information comprises:

applying the facility information data, the source location, and the target location to a navigation model to generate the navigation information, the navigation model being obtained by training with reference facility information data, a reference source location, and a reference target location as inputs and reference navigation information as an output.

* * * * *